United States Patent
Aghevli

Patent Number: 5,868,577
Date of Patent: Feb. 9, 1999

[54] FACTOR BLOCKS KIT AND METHOD OF USE

[76] Inventor: Behrouz B. Aghevli, 8380 Greensboro Dr., No. 921, McLean, Va. 22102

[21] Appl. No.: 801,341

[22] Filed: Feb. 19, 1997

[51] Int. Cl.⁶ .................................................. G09B 1/00
[52] U.S. Cl. ........................................ 434/195; 434/208
[58] Field of Search ................................ 434/195, 208, 434/209

[56] References Cited

U.S. PATENT DOCUMENTS

| | | | |
|---|---|---|---|
| 1,305,724 | 6/1919 | Kennedy | 434/195 |
| 1,594,376 | 8/1926 | Passmore | 434/195 |
| 2,635,365 | 4/1953 | Thompson et al. | 434/195 |
| 2,866,278 | 12/1958 | Snarr | 434/195 |
| 3,229,388 | 1/1966 | Smith | 434/195 |
| 3,403,460 | 10/1968 | Barrows | 434/208 |
| 4,332,567 | 6/1982 | Nogues | 434/195 |
| 4,548,585 | 10/1985 | Kelly | 434/195 |
| 4,585,419 | 4/1986 | Rinalde, III | 434/195 |
| 4,632,661 | 12/1986 | Mordensen | 434/208 |
| 4,645,461 | 2/1987 | Mordenstein | 434/208 |
| 4,838,794 | 6/1989 | Coddington | 434/195 |
| 5,076,793 | 12/1991 | Achevli et al. | 434/195 |
| 5,098,301 | 3/1992 | Woods | 434/195 |
| 5,108,291 | 4/1992 | Kuo | 434/208 |
| 5,137,452 | 8/1992 | Pollock | 434/195 |
| 5,645,431 | 7/1997 | Dreyfous | 434/195 |

*Primary Examiner*—Paul J. Hirsch

[57] ABSTRACT

A factor blocks kit having a plurality of cubic, rectangular and triangular prisms and rectangular mats. These prisms have edges (sides) that measure either 1 unit or a 1-digit prime number of units in length. These prisms are scored with unit markings on some of their sides. The bases of the triangular prisms form a 3-4-5 unit right triangle. The kit also includes a number of rectangular mats with sides being a one digit number of units in length. The mats are divided into unit squares. The kit includes teachers guides and student work books in both print and electronic form on the World Wide Web or the Internet.

21 Claims, 21 Drawing Sheets

| | |
|---:|---:|
| 1 | 60 |
| 2 | 30 |
| 3 | 20 |
| 4 | 15 |
| 5 | 12 |
| 6 | 10 |
| 10 | 6 |
| 12 | 5 |
| 15 | 4 |
| 20 | 3 |
| 30 | 2 |
| 60 | 1 |

Fig 22

| Block Surface Dimension | Equation of Line |
|---|---|
| 1x1 | y = x |
| 1x2 | y = 2x |
| 1x3 | y = 3x |
| 2x1 | 2y = x or y = (1/2)x |
| 3x1 | 3y = x or y = (1/3)x |
| 2x3 | 2y = 3x or y = (3/2)x |
| 3x2 | 3y = 2x or y = (2/3)x |
| 2x5 | 2y = 5x or y = (5/2)x |

Fig 23

| Block Dimensions | Algebraic Variable |
|---|---|
| 1x1x2 | x |
| 1x1x3 | y |
| 1x1x5 | z |
| 1x1x7 | w |
| 1x2x2 | x2 |
| 1x2x3 | xy |
| 1x2x5 | xz |
| 1x3x3 | y2 |
| 1x3x5 | yz |
| 1x5x5 | z2 |
| 2x2x2 | x3 |
| 2x2x3 | x2y |
| 2x2x5 | x2z |
| 2x3x3 | z2 |
| 2x3x5 | xyz |
| 2x5x5 | xz2 |

FACTOR BLOCKS KIT AND METHOD OF USE

FIELD OF THE INVENTION

The present invention relates generally to an educational aid for developing basic mathematical skills. In particular, the present invention relates to teaching arithmetic employing the use of integers, fractions, and variables utilizing various sized cubic, rectangular, and triangular prism blocks in a puzzle game format.

BACKGROUND OF THE INVENTION

Learning mathematical skills such as geometry, algebra, and fractions are an essential part of the educational process. These skills are regularly taught by rote memorization and other methods.

In light of the importance of a person's mathematical abilities, instructors are faced with the daunting task of teaching children as well as adults effective mathematic skills. Over the years many techniques have been devised to teaching mathematical skills. The majority of these techniques utilize game pieces such as cubic and rectangular prisms which represent integers, fractions, and variables. Most of these games, however, are limited in the manner and scope of their teachings. For example, some games only teach addition and subtraction, while other games teach only multiplication. The majority of these games are limited to a certain base number which are not capable of being used for alternate base numbers.

Several inventors have attempted to devise methods for teaching these mathematical skills in a more fun-filled environment. Creative Publications Catalog (1994) discloses "Diene's Multi-base Blocks" which utilize base ten blocks. Diene's Multi Base Blocks are also produced for base units of three, four, five, and six.

Creative Publications Catalog (1994) also discloses "The Cuisenaire Rods" and "The Algebra Lab Gear." The Cuisenaire Rods consist of a unit cube (1×1×1) and nine other rods with a base of one by one square and lengths of two, three, . . . , and 10 units. The Algebra Lab Gear consists of a unit square (1×1×1), a five rod (1×1×5), a 25 flat rectangular prism (1×5×5), and other cubic and rectangular prisms. The cubic and rectangular prisms of the Algebra Lab Gear have either none, one or two sides equal to one unit and the other sides equal to two non-integer lengths that are used to represent x and y.

Several U.S. patents also disclose kits and puzzles that utilize blocks and other geometric shapes for the teaching of mathematical skills. U.S. Pat. No. 4,548,585 to Kelly discloses ten shapes each distinctive of an integer from one to ten and each being distinctively colored. The shapes of at least some of the integers are placed together in a composite shape which is the same as the shape of a larger integer to which the smaller integer equals.

U.S. Pat. No. 4,585,419 to Rinaldelli discloses an aid for teaching number systems of any base utilizing a series of containers and a number of pieces each representing a numerical unit. For example, the base 10 unit cubes are used to fill up a first box, and 10 such filled boxes are used to make up a larger box, etc.

A method of teaching addition and subtraction is disclosed in U.S. Pat. No. 234,247 to Classen. The '247 patent discloses an apparatus for teaching arithmetic having three blocks of three orders of magnitude (in the base 10). Blocks are positioned directly above or below associated numbered spaces which are provided in a partitioned box. The blocks in the spaces below the second number are then placed in the spaces above the first number to illustrate the addition of the units. Subtraction is also accomplished using a similar technique.

An error control technique for teaching rudimentary mathematics is disclosed in U.S. Pat. No. 2,663,096 to McCurdy. McCurdy teaches an educational toy consisting of blocks made in various lengths from a size one unit long to a size 10 units long. These blocks are stacked next to an error control blueprint, i.e., a sheet marked with squares or rectangles which correspond exactly in size with the unit sizes of the blocks, thereby indicating the correct pattern for stacking the blocks.

U.S. Pat. No. 3,002,295 to Armstrong discloses a device for teaching number concepts which includes an arithmetic answer board lineated into a plurality of square spaces which define a plurality of vertically extending rows. The spaces are numbered from bottom to top such that the number in each space represents the number of spaces below that space. The elements in each row of spaces are a different color from the first to the tenth row, with the color cycle repeating itself from the eleventh to the twentieth row. Subtraction, multiplication, and division can also be taught using this device.

Teaching slightly more complex mathematics is disclosed in U.S. Pat. No. 4,504,234 to Jarvis (the "'234 patent"). The '234 patent discloses an aid for learning roots which includes a flat surface with a number of unit squares inscribed inside a larger square surrounded by a border.

Others references which utilize blocks and puzzle games for teaching mathematic skills include U.S. Pat. No. 846,485 to Leitch; U.S. Pat. No. 5,108,291 to Kuo; U.S. Pat. No. 2,394,864 to Lutton; U.S. Pat. No. 3,229,388 to Smith; U.S. Pat. No. 4,772,208 to Tsokas; U.S. Pat. No. 1,305,724 to Kennedy; and the "Mortonensen more than Math Material." All of these references use various sized blocks, including squares, rectangles triangles, and techniques for teaching rudimentary and advanced mathematical skills.

In order to overcome the shortcomings of the prior art a new technique for teaching mathematic skills is needed. This technique would comprise a puzzle game having various sized cubic, rectangular, and triangular blocks and colored mats.

SUMMARY OF THE INVENTION

It is therefore an object of the present invention to provide a learning tool to teach the concepts of mathematic skills utilizing a puzzle game having cubic, rectangular, and triangular prism blocks.

It is also an object of the present invention to provide a learning tool to teach mathematical concepts through construction activities and games.

It is a further object of the present invention to provide a learning tool to teach number concepts and integer arithmetic.

It is still a further object of the present invention to provide a learning tool to teach mathematical concepts using the World Wide Web and the Internet.

It is another object of the present invention to provide a learning tool to teach the concept of fractions and fractional arithmetic.

It is yet another object of the present invention to provide a learning tool to teach the concepts of prime factorization, greatest common factors, and least common multiples.

It is still another object of the present invention to provide a learning tool that can be used to teach algebra.

These and other objects and advantages of the present invention will be apparent to those of ordinary skill in the art upon inspection of the detailed description, drawings, and appended claims.

The "Factor Blocks Kit and Method of Use," ("the present invention") is contemplated for use by children and adults for learning mathematical skills utilizing various cubic, rectangular, and triangular prisms, and colored mats. The present invention further comprises: i) a storage box, ii) work books, iii) teacher guides, and iv) electronic versions of the work book and the teacher guides for use on the World Wide Web and the Internet.

The prism and mat edges (sides) have various lengths from one unit to a one-digit prime number of units in length. The majority of the sides of the rectangular prism are scored (engraved or marked) by unit squares that are products of one, two or three one digit prime numbers. The rectangular prisms are also used to represent variables such as x, y or z.

By placing the cubic, rectangular, or triangular prisms next to one another various mathematical relationships are taught. For instance, prime numbers are taught by placing one, three, five, seven, etc. prisms side-by-side to represent the respective prime numbers. Multiplication tables are taught by placing a variety of prisms in an ordered manner. By stacking and aligning the prisms in a certain manner greatest common factors and least common multiples are also calculated.

BRIEF DESCRIPTION OF THE DRAWINGS

FIG. 21 shows a table of reciprocals.

FIG. 22 shows a table of equations of a straight line.

FIG. 23 shows a table of variables.

DETAILED DESCRIPTION OF THE INVENTION

The present invention is a puzzle game designed to teach children as well as adults mathematical skills such as the computation of mathematical equations, fractions, and other complex mathematical concepts. The dimensions of the puzzle game, including the cubic, rectangular, and triangular prisms, mats, colors, and other variables and quantities specified herein may vary with the type of puzzle game contemplated for use with the present invention. Therefore, numbers and dimensions specified herein are not to be construed as limitations on the scope of the present invention but are meant to be merely illustrative of one particular application. The present invention comprises a plurality of educational aids for teaching mathematical concepts including: i) a storage box; ii) work books; iii) teacher guides; iv) electronic versions of the work book and the teacher guides for use in the World Wide Web and Internet; and v) manipulative components comprising cubic, rectangular, and triangular prisms and mats of different sizes and colors.

In the preferred embodiment, the prisms have edges (sides) that measure either one unit or a one-digit prime number (i.e. two, three, five or seven) units in length. The triangular prisms have bases that form a 3-4-5 unit right triangle and the rectangular mats have sides that measure either one unit or a one-digit prime number units in length. It is preferred that all except one, two or three sides of each of the rectangular prisms are scored (engraved or marked) by unit squares.

The rectangular prisms are used to represent numbers that are products of one, two or three one digit prime numbers. The rectangular prisms are also used to represent several variables come of which include x, y, z, w, x2, y2, xy, xz, yz, xyz, x2y, xz, xy2, y2z, etc. For example the 1×1×2, 1×3×3, and 2×3×5 prisms represent the variables x, y2, and xyz, respectively.

Figure 1A:
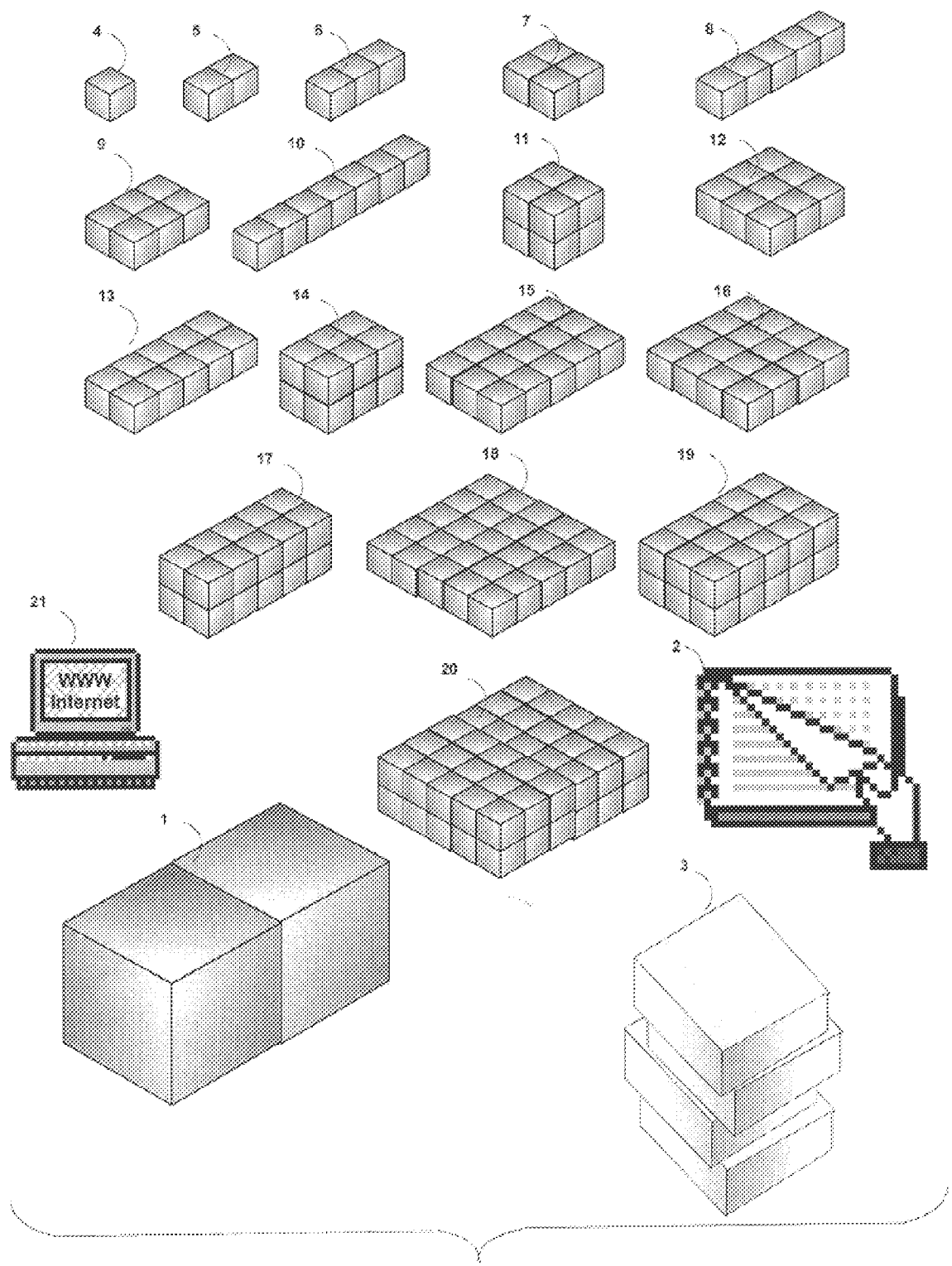
FIG. 1a shows a plan view of a representative sample of components of the Factor Blocks kit.

FIG. 1a shows a plan view of a representative sample of components of the Factor Blocks kit including a storage box 1 which contains all the manipulative components. The instructional components of the present invention comprise student workbooks 2 and teachers guides 3. The student workbooks 2 and teachers guides 3 are available through the Internet and World Wide Web 21.

In the preferred embodiment, the primary manipulative components comprise:

60 one block prisms (1×1×1) 4

30 two block prisms (1×1×2) 5

20 three block prisms (1×1×3) 6

15 four block prisms (1×1×2) 7

12 five block prisms (1×1×5) 8

10 six block prisms (1×2×3) 9

Seven block prisms (1×1×7) 10

Eight block prisms (2×2×2) 11

Three nine block prisms (1×1×3) 12

Six ten block prisms (1×2×5) 13

Five 12 block prisms (2×2×3) 14

Four 15 block prisms (1×3×5) 15
Four 16 block prisms (1×4×4) 16
Three 20 block prisms (2×2×5) 17
Four 25 block prisms (1×5×5) 18
Two 30 block prisms (2×3×5) 19
One 60 block prism (2×5×6) 20

Figure 1B:
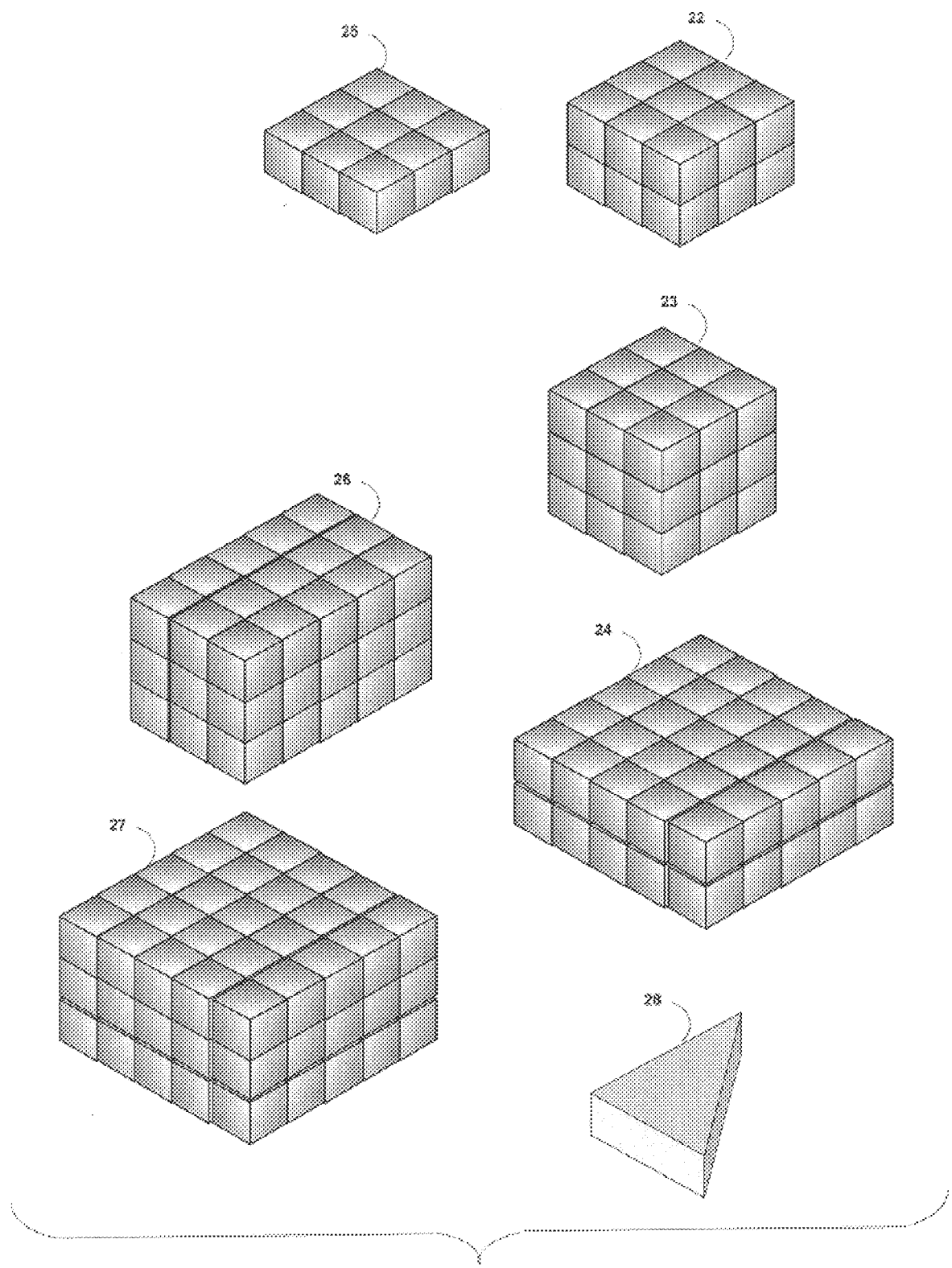
FIG. 1b shows a plan view of a representative sample of a supplemental set of cubic and rectangular prisms.

FIG. 1b shows a supplementary set of cubic, rectangular, and triangular prisms utilized in the present invention. These supplementary blocks include:

An 18 block rectangular prism (2×2×3) 22
A 27 cubic block prism (3×3×3) 23
A 50 rectangular block prism (2×5×5) 24
A nine rectangular block prism (1×3×3) 25
A 45 rectangular block prism (3×3×5) 26
A 75 rectangular block prism (3×5×5) 27
A 3-4-5 triangle 28

The preferred embodiment contemplates the use of the following combination of factor blocks.

Three 18 rectangular block prisms (2×2×3)
Eight 27 cubic block prisms (3×3×3)
Two fifty rectangular blocks prisms (2×5×5)
One 14 rectangular block prism (1×2×7)
One 28 rectangular block prism (2×2×7)
One 49 rectangular block prism (1×7×7)
One 125 cubic block prism (5×5×5)
16 triangular block prisms with a base lengths of three, four and five and a height of one unit
Four triangular block prisms with a base of lengths three, four and five units and height of five unit.

Recognizing Factors—Even, Odd, and Prime Numbers

Figure 2:
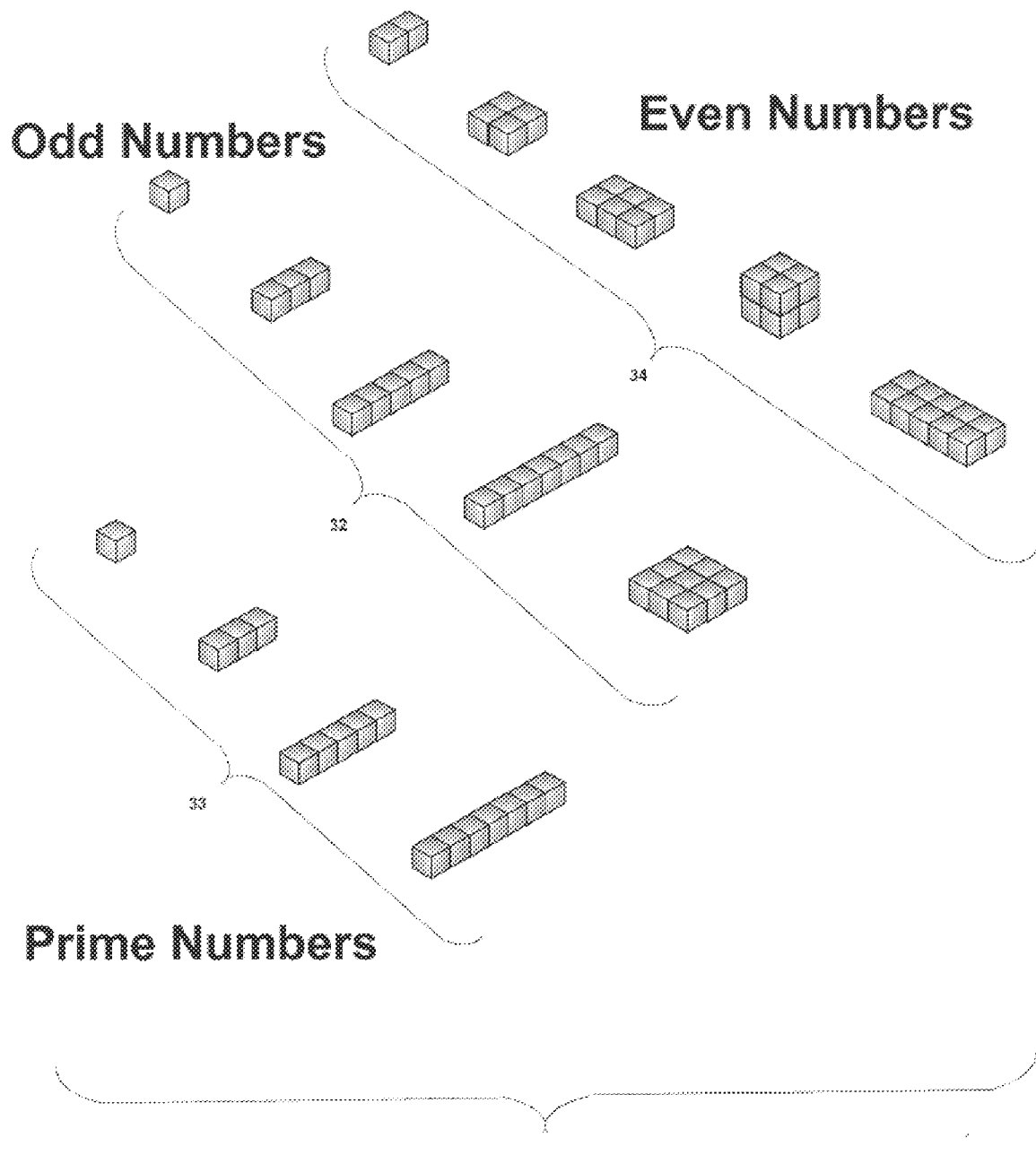
FIG. 2 shows a plan view of prisms which represent a sample of even, odd, and prime numbers.

FIG. 2 shows odd 32, prime 33, and even 34 numbers. When stacking the prisms the even numbers 34 always have a side that is a multiple of two units long. For instance, combining eight prisms together forms a two-by-four row and combining ten prisms forms a two-by-five row. Odd numbers 32, on the other hand, do not share the above mentioned property.

Learning the Multiplication table—Step by Step

Figure 3:
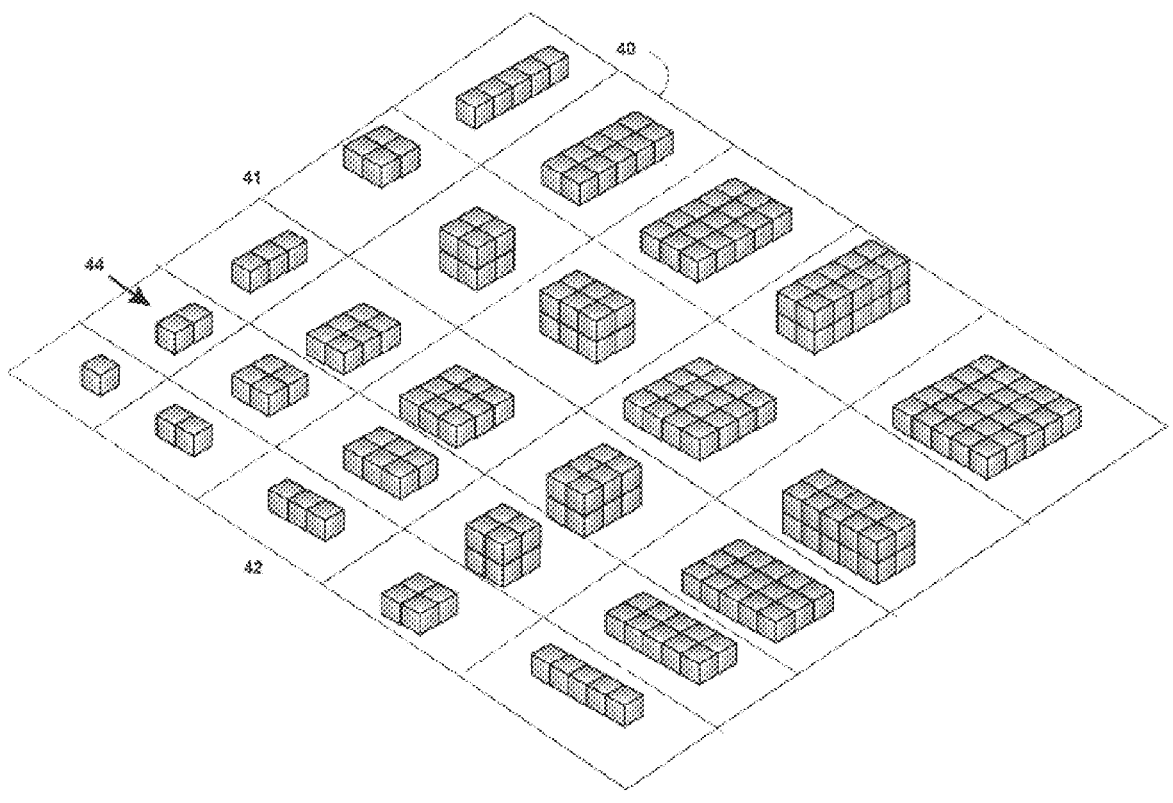
FIG. 3 shows a plan view of a multiplication table.

FIG. 3 shows a five-by-five multiplication table 40. To teach multiplication the student must find the intersection point between two prism blocks located on side one 41 and side two 42 of the multiplication table 40. For example, the intersection point of a three prism block on side one 41 and a two prism block on side two 42 of the multiplication table 40 equals a six prism block, e.g., 2×3=6.

The multiplication table 40 also shows that multiples are symmetrical around the "diagonal" of table 40. For example, the intersection point of a three prism block on side one 41 and a two prism block on side two 42 equals the intersection point of a two prism block on side one 41 and a three prism block on side two 42. It is also noted that all the prism blocks located on the diagonal starting from the corner of side one 41 and side two 42 are always a square number, such as four, nine, 16, etc.

The prism blocks of the multiplication table 40 can also be placed so that all the prism blocks in a row (or column) have a side that is identical to the row (column) number. In this manner, the student can readily identify the relationships amongst the prism blocks in every row. For example, each block of prisms in row one 42 can be aligned so that they are each a one-by-x prism blocks. This relationship exists for all prisms in a row, such as a two-by-one (equivalent to a two prism block) or a two-by-two (equivalent to a four prism block) for the second row 44.

Prime Number Factorization

Figure 4:
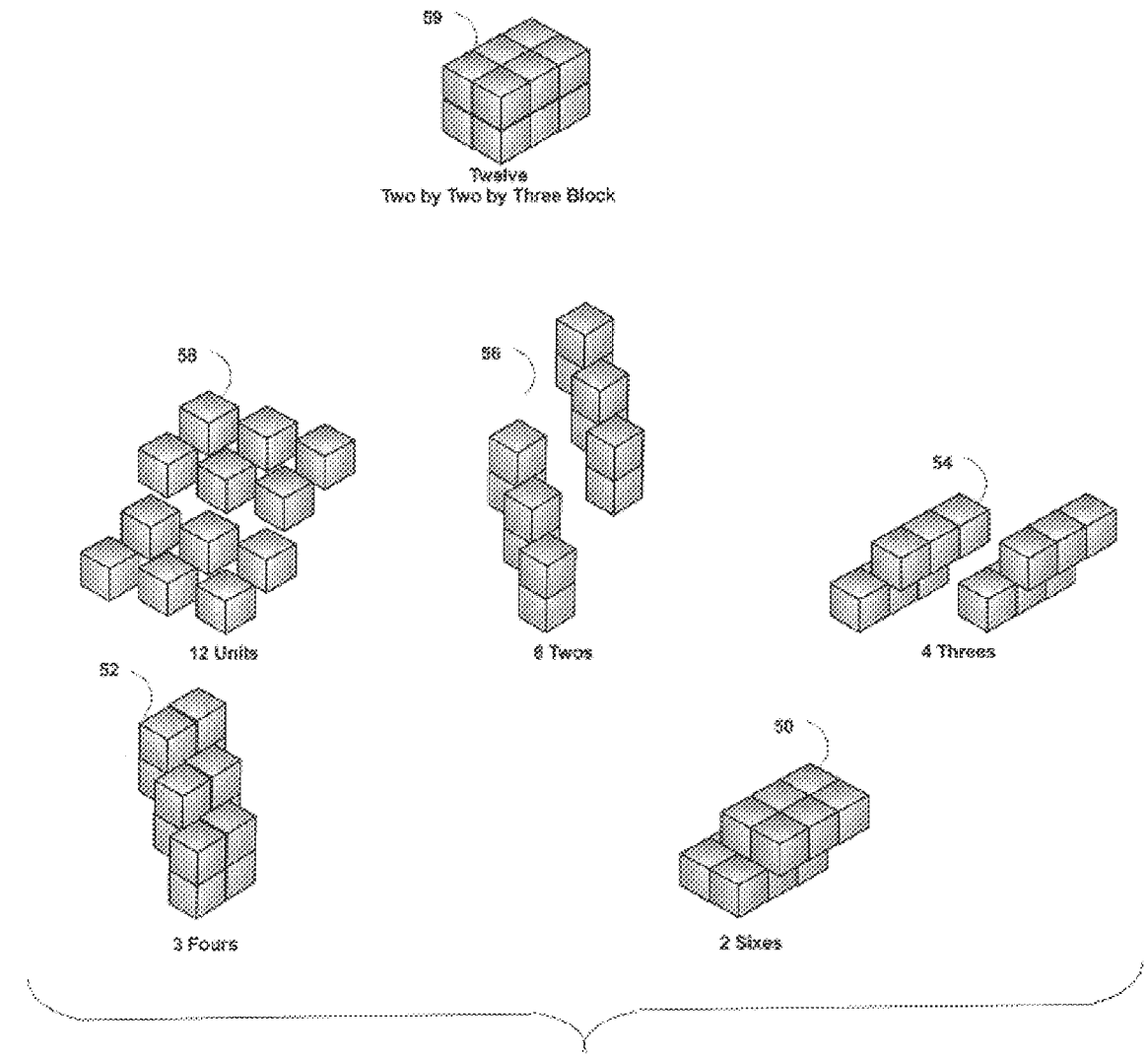
FIG. 4 shows a plan view of the prime factorization of the number 12.

FIG. 4 shows the prime factorization of the number. To equal the given multiple of a block of 12 prisms (2×2×3) 59, two "chunks" of six prisms 50 are multiplied, three chunks of four prisms 52 are multiplied, four chunks of three prisms 54 are multiplied, six chunks of two prisms 56 are multiplied or 12 chunks of one prisms 58 are multiplied. That is, the 12 block prism (2×2×3) 59 is divisible by 12, six, three, two, and one. The student can also rearrange the 12 block prism (2×2×3) 59 into level configurations, whereby the of 12 block prism (2×2×3) 59 is divisible by six and two, or three and four. Other variations of are contemplated for use with the present invention.

Greatest Common Factor (GCF)

Figure 5:
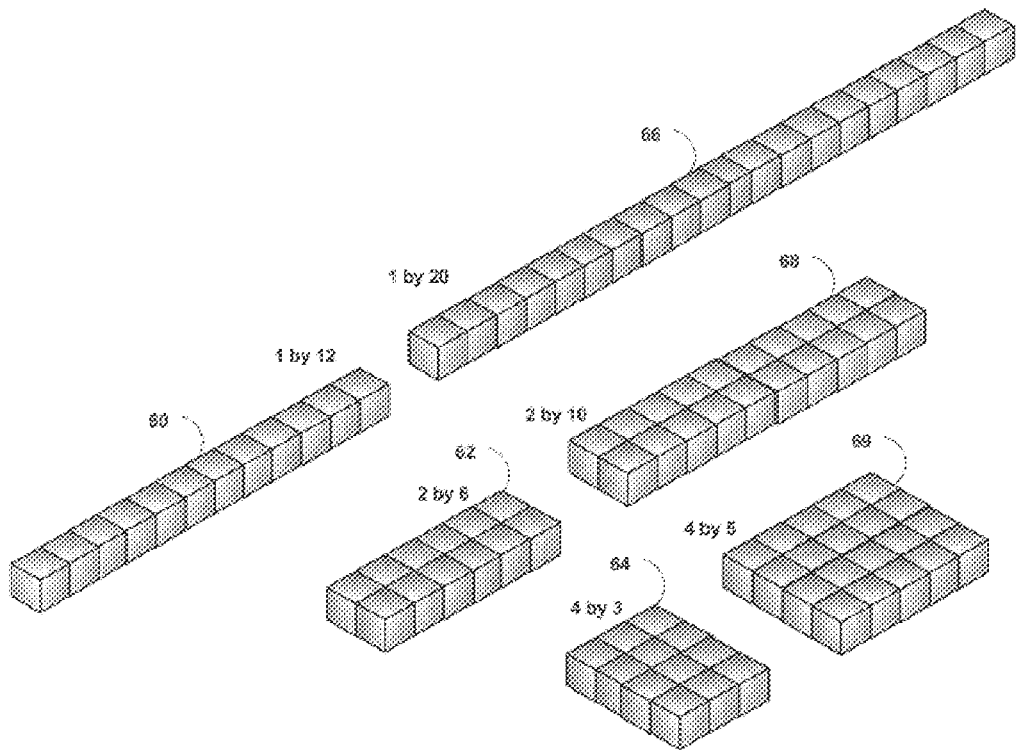
FIG. 5 shows a sample plan view for finding the Greatest Common Factor.
Figure 6:
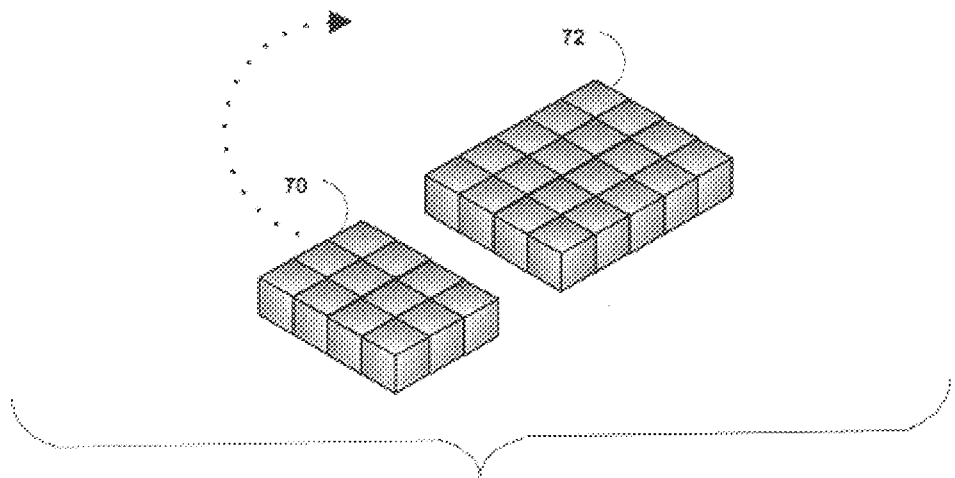
FIG. 6 shows a sample plan view for finding the Greatest Common Factor by placing two levels of Factor Blocks side-by-side.

To find the GCF of any two given numbers the student arranges the prisms in a level manner and thereafter discerns the largest side of the arranged prisms that is common to both given prisms. FIG. 5 shows the GCF of 12 as a one-by-12 prism block 60, 2-by-6 prism block 62, and a four-by-three prism block 64. FIG. 5 also shows the GCF of 20 as a one-by-20 prism block 66, a two-by-10 prism block 68, and a four-by-five prism block 69. This being the case the student finds the largest side that is common to both given numbers, e.g., four. As seen in FIG. 6 the GCF of 12 and 20, as represented by rectangular prism blocks 70 and 72, respectively, is four. This technique can be utilized to ascertain the GCF for any two, three, four, etc. given numbers.

Least Common Multiple (LCM)

Figure 7:
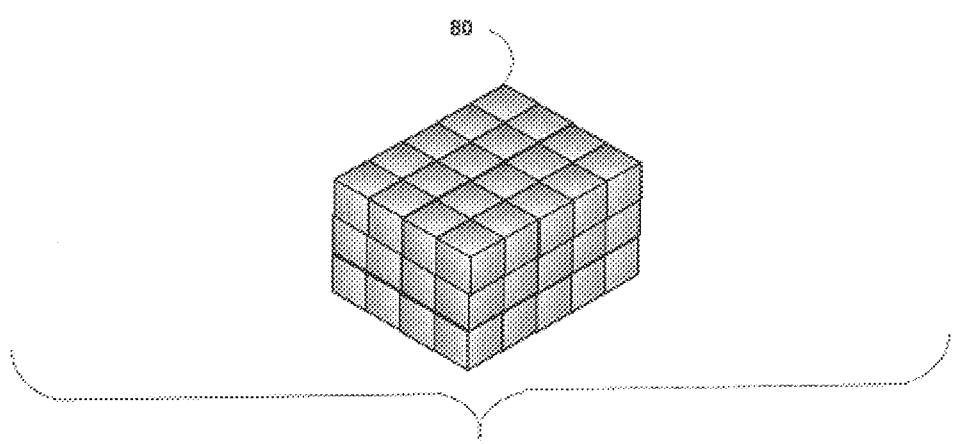
FIG. 7 shows a sample plan view for finding the Least Common Multiple.

FIG. 7 shows a method for finding the LCM. To find the LCM of 12 and 20 the participant places the largest side that is common to both given numbers(prism blocks 70 and 72)side-by-side so that the GCF sides are adjacent. Thereafter, the participant constructs a rectangular prism block 80 that is 12 (1×3×4) units long on one side and 20 (1×4×5) units long on the other side as shown in FIG. 7. The volume of the rectangular prism block 80 equals the LCM.

Fractions—Babylonian Style

Figure 8:
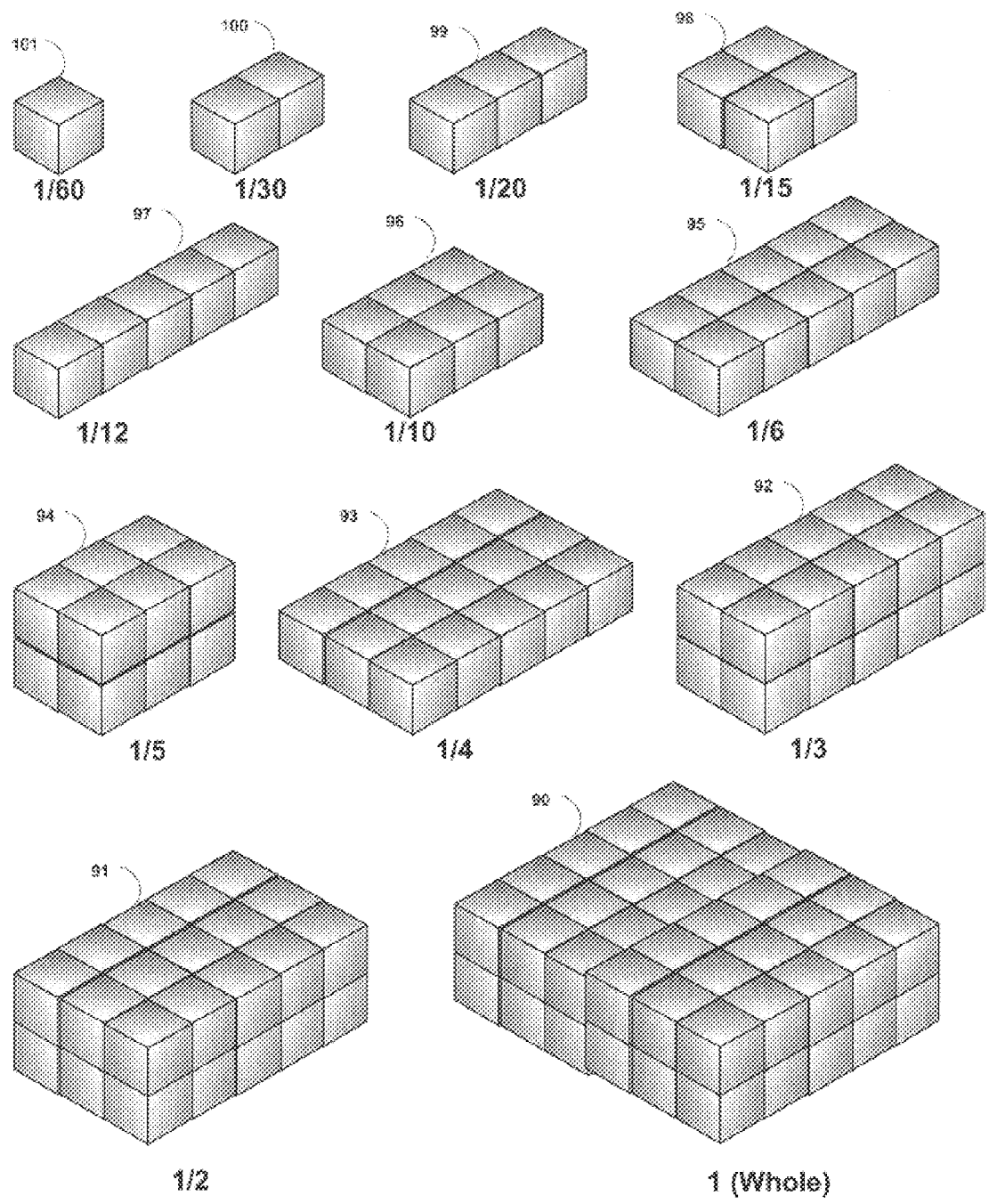
FIG. 8 shows a plan view of different fractions.

To understand the use of fractions, a whole unit block is provided for the participant to calculate the fractional equivalents thereof For example, if the participant uses a "2 block prism" and breaks it into two "1 block prisms" a fraction of ½ becomes evident. FIG. 8 shows different fractions using a 60 prism block (2×5×6) 90 as a whole unit (1). These fractions include:

A 30 prism block (2×3×5) 91 equaling ½ of the whole unit
A 20 prism block (2×2×5) 92 equaling ⅓ of the whole unit
A 15 prism block (1×3×5) 93 equaling ¼ of the whole unit
A 12 prism block (2×2×3) 94 equaling ⅕ of the whole unit
A 10 prism block (1×2×5) 95 equaling ⅙ of the whole unit
A six prism block (1×2×3) 96 equaling 1/10 of the whole unit
A five prism rod (1×1×5) 97 equaling 1/12 of the whole unit
A four prism block (1×2×2) 98 equaling 1/15 of the whole unit
A three prism rod (1×1×3) 99 equaling 1/20 of the whole unit
A two prism rod (1×1×2) 100 equaling 1/30 of the whole unit
A one unit prism (1×1×1) 101 equaling 1/60 of the whole unit.

Alternate embodiments of the present invention contemplate the use of other whole numbers and fractional equivalents, whereby an infinite number of combinations can be formed.

Adding Fractions

Figure 9:
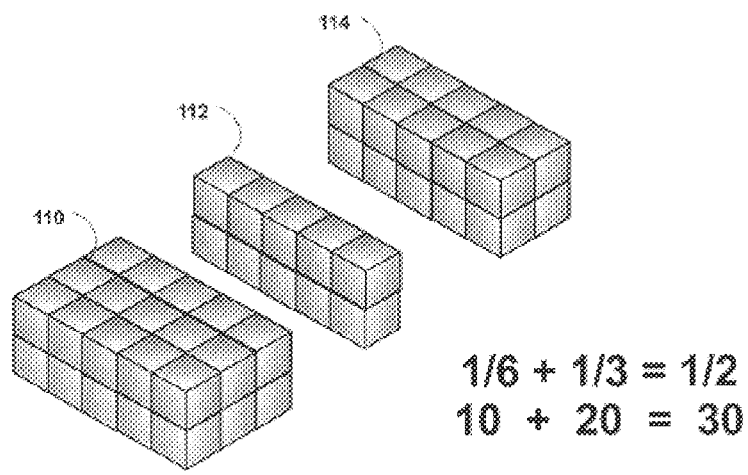
FIG. 9 shows a plan view of adding fractions

FIG. 9 and 21 show a method of adding fractions. In this case, the participant replaces the fraction operations of FIG. 9 by the whole number operations of FIG. 21. FIG. 21 can be extrapolated to include the equivalents of an infinite amount of whole number equivalents. This method is also used for subtracting, multiplication, and division of fractions. In order to use FIG. 21. all numbers depicted in the second row are considered fractional equivalent, e.g., 60 equal $\frac{1}{60}$, 30 equals $\frac{1}{30}$, etc.

Referring again to FIG. 9 and 21, $\frac{1}{6}+\frac{1}{3}$ (FIG. 9) is replaced with whole numbers 10+20 (FIG. 21), or in the alternative, a 10 rectangular prism block (1×2×5) 112 and a 20 rectangular prism block (2×2×5) 114. By adding the whole numbers 10 and 20 or the prism block equivalents the participant can easily calculate the corresponding fraction. For example, by equating 10+20 to 30 (or a 30 rectangular prism block 110) the participant can then equate $\frac{1}{6}+\frac{1}{3}$ by scanning FIG. 21 for the fractional equivalence of 30 which is ½ (or 2 as shown in FIG. 21).

Subtracting Fractions

Figure 10:
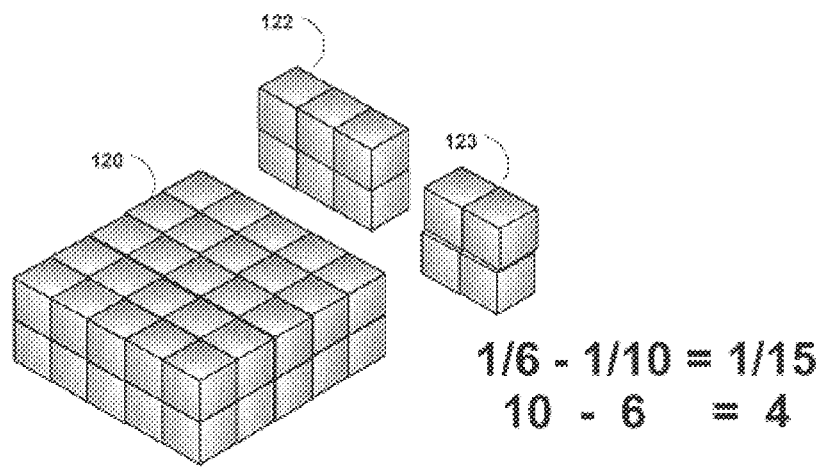
FIG. 10 shows a plan view of subtracting fractions.

FIG. 10 shows a method of subtracting fractions. In this case, the participant replaces the fraction operations of FIG. 10 by the whole number operations of FIG. 21. For example, $\frac{1}{6}-\frac{1}{10}$ is replaced with whole numbers 10-6, or in the alternative, a 10 rectangular prism block 120 and a six rectangular prism block 122. By subtracting the whole numbers 10 and 6 or the prism block equivalents the participant can calculate the corresponding fraction. For example, by equating 10-6 to 4 (or a 4 rectangular prism block 123) the participant can then equate $\frac{1}{6}-\frac{1}{10}$ by scanning FIG. 21 for the fractional equivalence of 4 which is $\frac{1}{15}$ (or 15 as shown in FIG. 21).

Multiplying Fractions

Figure 11:
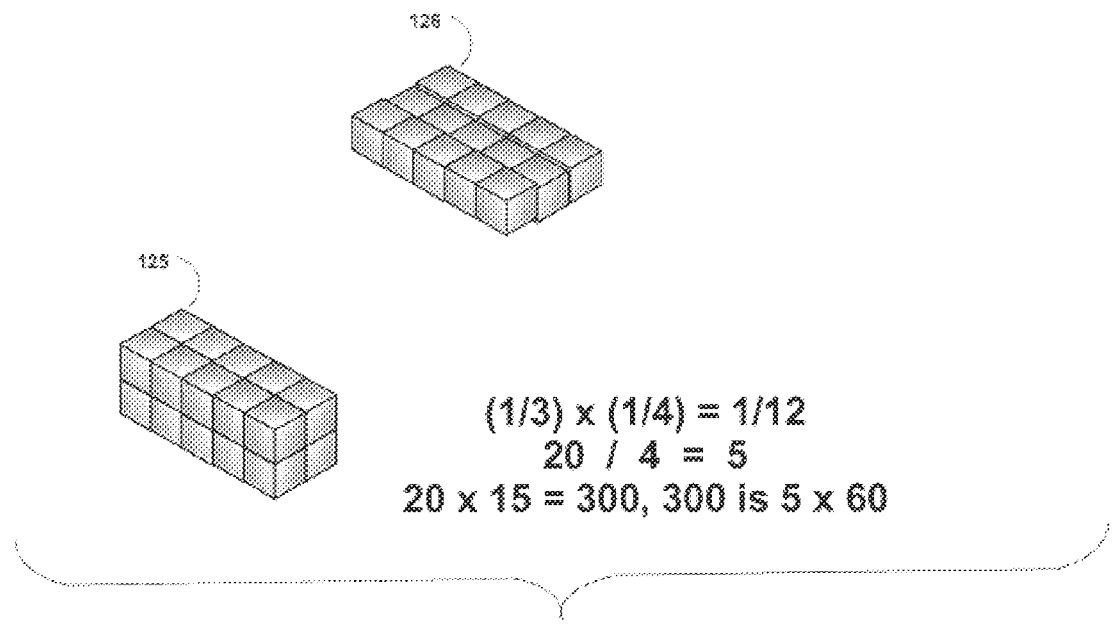
FIG. 11 shows a plan view of multiplying fractions.

FIG. 11 shows a method of multiplying fractions. In this case, the participant replaces the fraction operations of FIG. 11 by the whole number operations of FIG. 21. If the resulting multiplied number is greater than 60 then it is necessary to divide that resulting number by 60 to equate the fractional equivalent of that resulting number. For example, $(\frac{1}{3})\times(\frac{1}{4})$ is replaced with whole numbers 20*15. By multiplying the whole numbers 20 and 15 or the prism block equivalents (125 and 126, respectively) the participant is able to calculate the corresponding fraction. For example, by equating 20*15 to 300 the participant can then equate $(\frac{1}{3})\times(\frac{1}{4})$ by first dividing 300 by 60 (e.g. five) and then scanning FIG. 21 for the fractional equivalence of five. Five is equivalent to $\frac{1}{12}$ (or 12 as shown in FIG. 21).

Dividing Fractions

Figure 12:
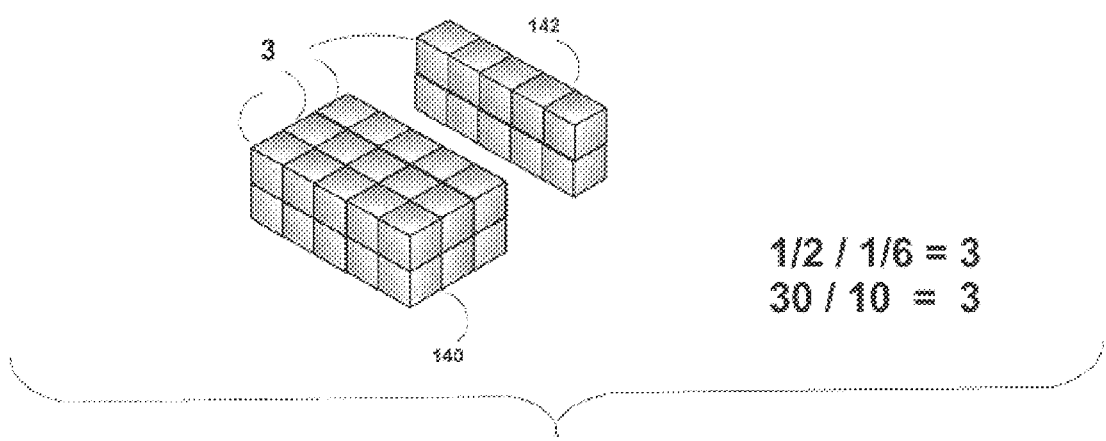
FIG. 12 shows a plan view of dividing fractions.

FIG. 12 shows a method of dividing fractions. In this case, the participant replaces the fraction operations of FIG. 12 by the whole number operations of FIG. 21 For example,$(\frac{1}{2})/(\frac{1}{6})$ is replaced with whole numbers whole numbers $\frac{30}{10}$ or a 30 rectangular prism block 140 and a 10 rectangular prism block 142. By dividing the whole numbers 30 and 10 or the prism block equivalents the participant calculates the corresponding fraction. For example, by equating $\frac{30}{10}$ to 3 the participant can then equate $(\frac{1}{2})/(\frac{1}{6})$ by scanning FIG. 21 for the fractional equivalence of 3 which is 3 (or 3 as shown in FIG. 21).

Negative Numbers—Negatives as Holes

Figure 13:
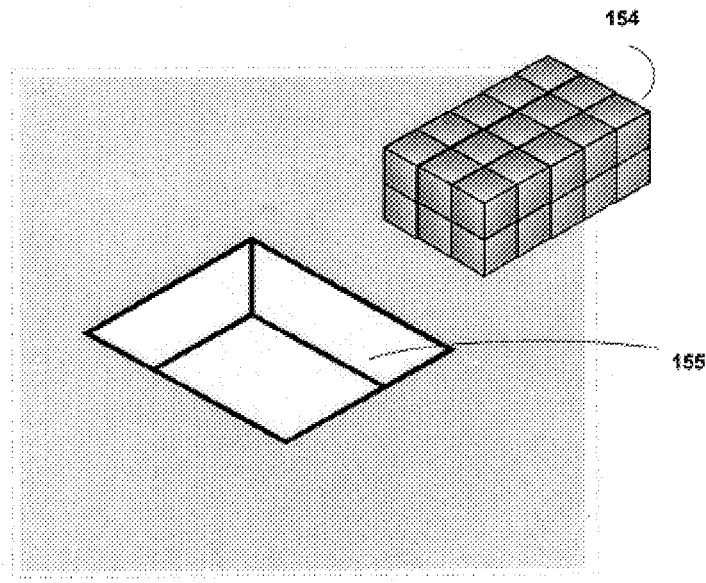
FIG. 13 shows a plan view of a representation for negative numbers.
Figure 13:
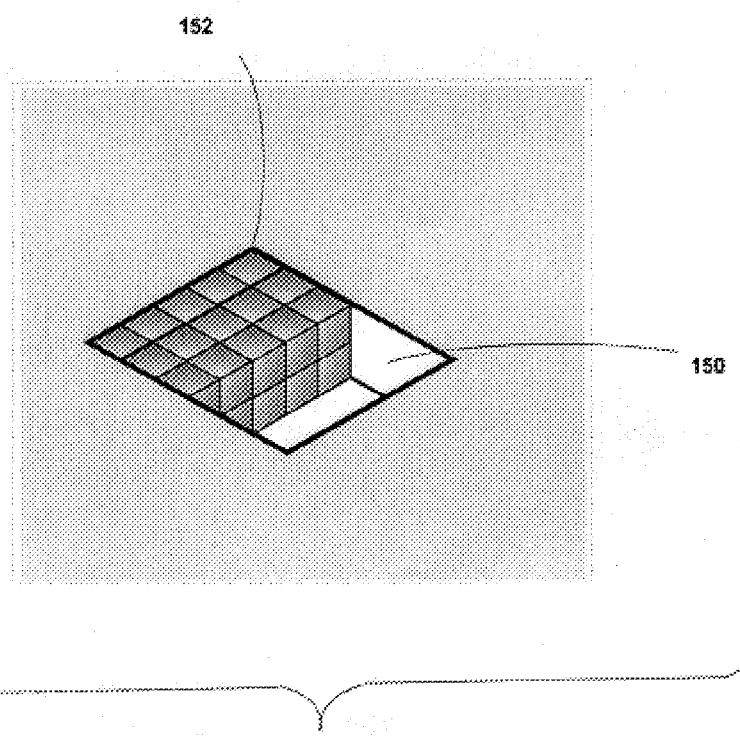

FIG. 13 shows negative numbers treated as holes (e.g., empty space). FIG. 13 shows a holding tray 150 which holds 60 blocks. A 30 block rectangular prism 154 is removed from the holding tray 150 and a 30 block rectangular prism 152 remains within the holding tray 150. The removal of the 30 block rectangular prism 154 creates a hole 155 in the holding tray 150 such that −60+30=−30. The 60 block holding tray 150 can be modified to hold an infinite amount of prism blocks in order to accomplish whole number and fractional operations with negative numbers.

Length, Surface, and Volume

The numeric value associated with each prism block is the volume of that prism block. For the unit block and the rods this same numeric value is also the length of the longest side of the rod. For the level blocks this same value corresponds to the largest surface of the level. Participants can engage in many interesting geometric activities finding the volume and the surface area of each of the prism blocks by deriving formulas relating these quantities to the length of the sides.

Graphing Linear Equations—Step by Step

FIGS. 14–16, and 22 show an equation of a straight line and slope. To understand the concepts of slope and intercept for a straight line a method of building "steps" using the factor blocks is utilized. FIGS. 14–16 and 22 are illustrative of the underlying steps and can be used for calculating various other slopes and intercept lines.

Figure 14:
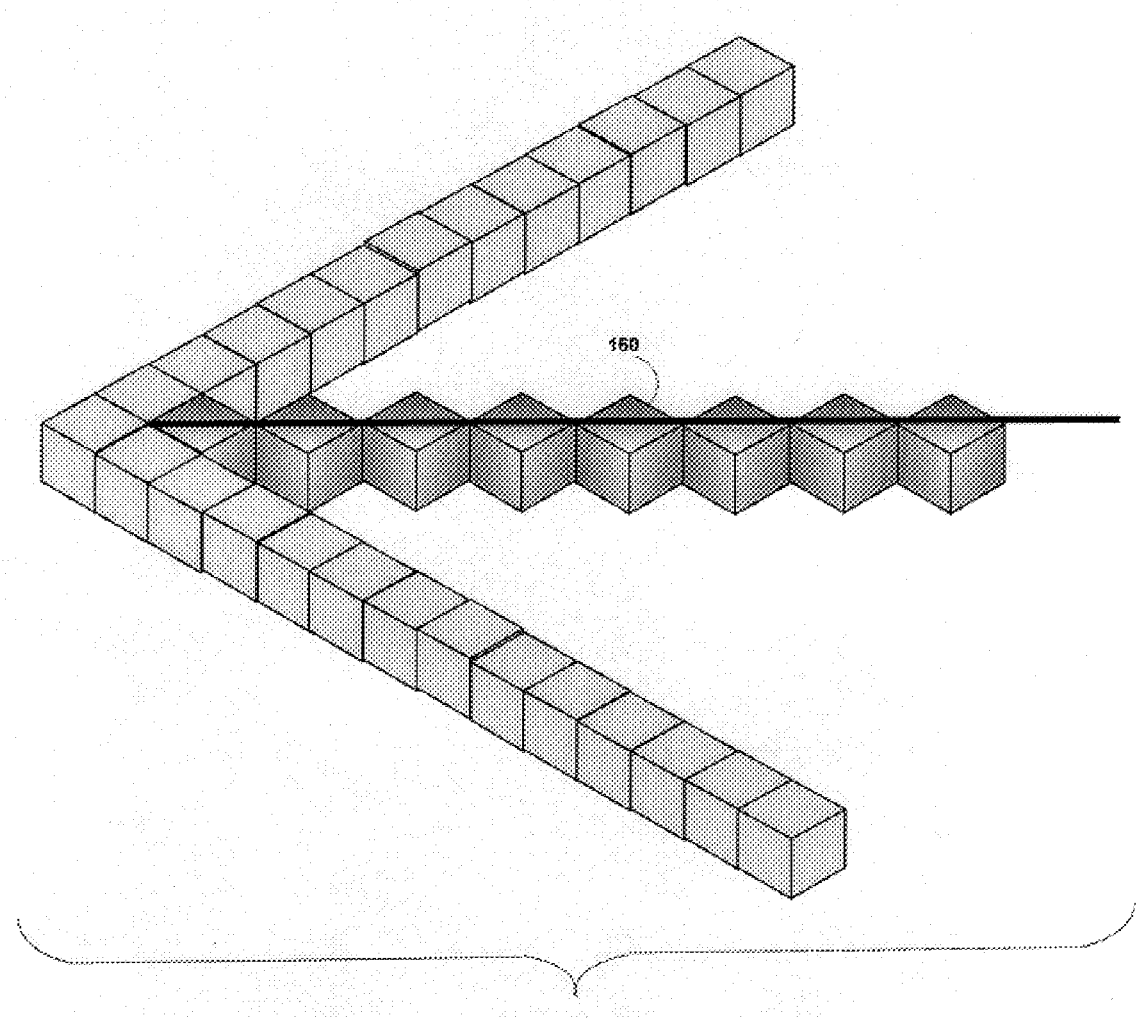
FIG. 14 shows a method for calculating the equation of a straight line.

FIG. 14 shows a method for understanding the equation of a straight line using a one-by-one step of prisms 160. That is, for every step taken on the "x" axis a corresponding step is taken on the "y" axis. In this case the slope of the line of FIG. 14 is y=x according to corresponding FIG. 22.

Figure 15:
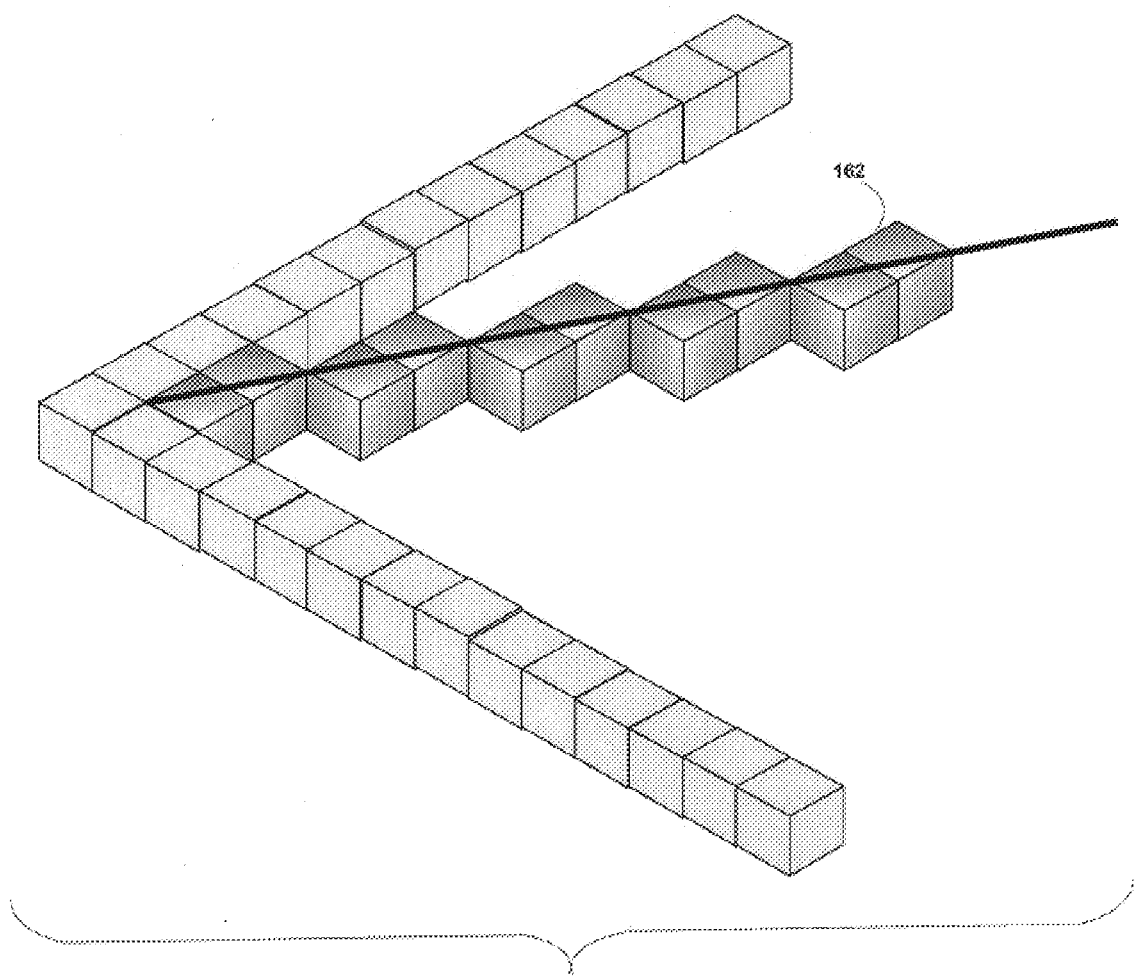
FIG. 15 shows a method for calculating the equation of a straight line.

FIG. 15 shows a method for understanding the equation of a straight line in a one-by-two step of prisms 162. That is, for every two steps taken on the "x" axis a corresponding step is taken on the "y" axis. In this case the slope of the line of FIG. 15 is y=2x according to corresponding FIG. 22.

Figure 16:
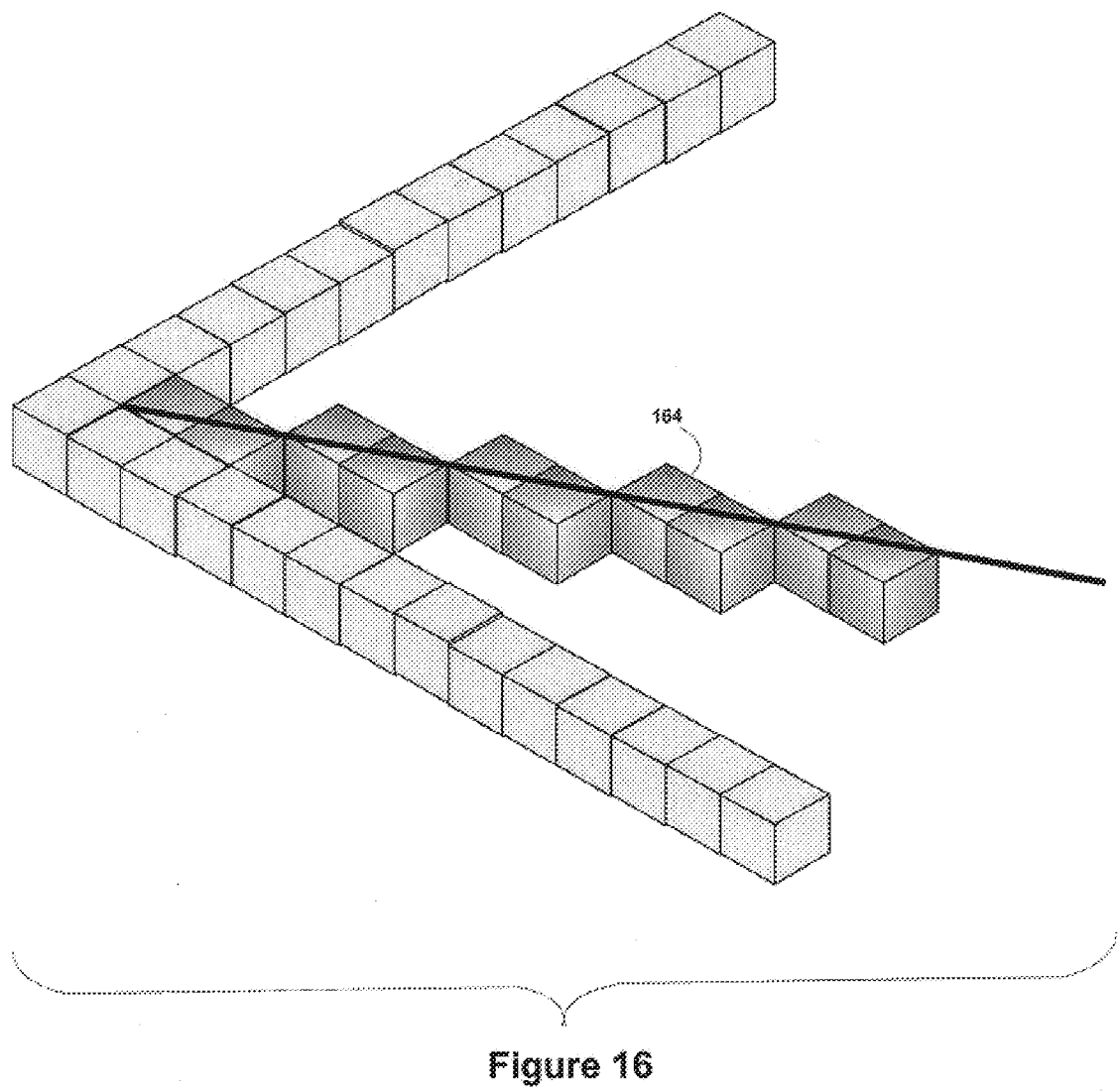
FIG. 16 shows a method for calculating the equation of a straight line.

FIG. 16 shows a method for understanding the equation of a straight line in a two-by-one step of prisms 164. That is, for every step taken on the "x" axis a corresponding two step is taken on the "y" axis. In this case, the slope of the line of FIG. 16 is y=(½)x or 2y=x according to corresponding FIG. 22.

Figure 17:
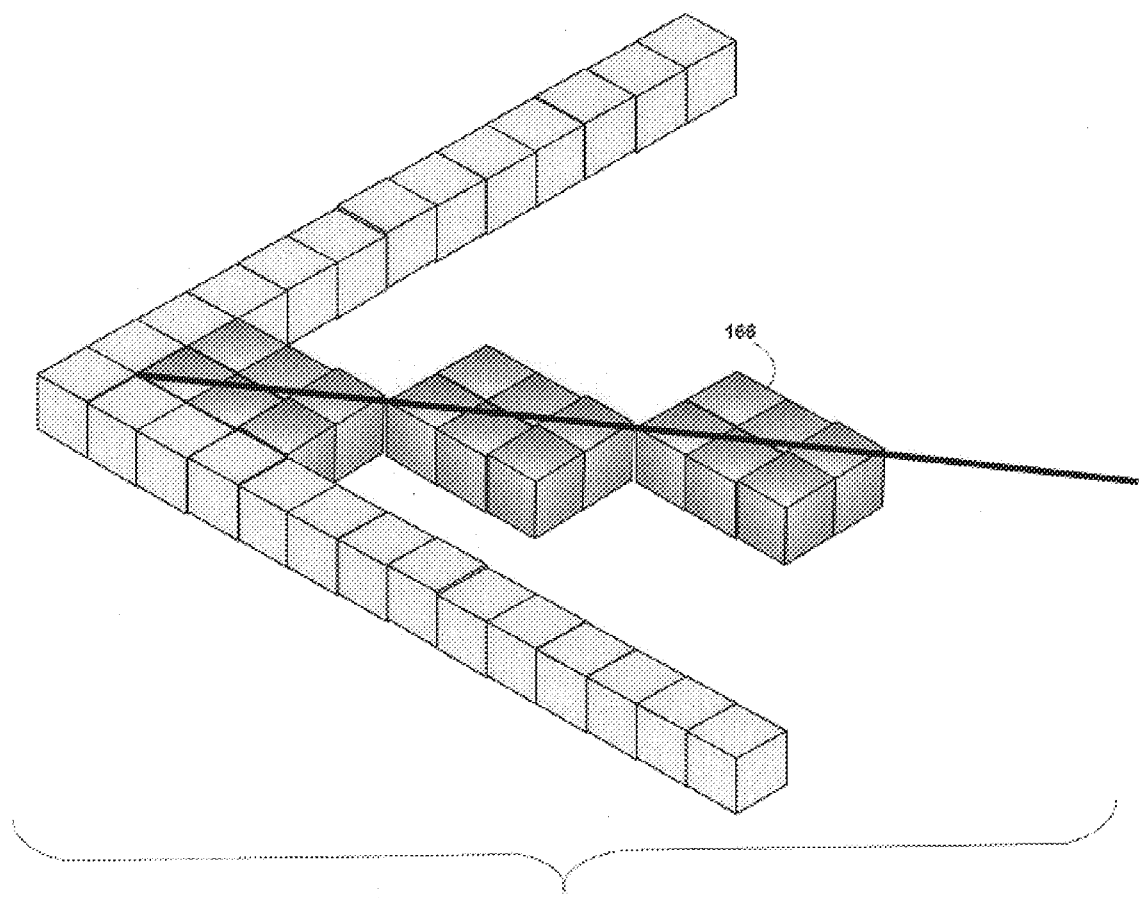
FIG. 17 shows a method for calculating the equation of a straight line.

FIG. 17 shows a method for understanding the equation of a straight line in a three-by-two step of prisms 166. That is, for every three steps taken on the "x" axis a corresponding two steps are taken on the "y" axis. In this case the slope of the line of FIG. 14 is y=($\frac{2}{3}$)x or 3y=2x according to corresponding FIG. 22.

Solving Algebraic Equations

Figure 18:
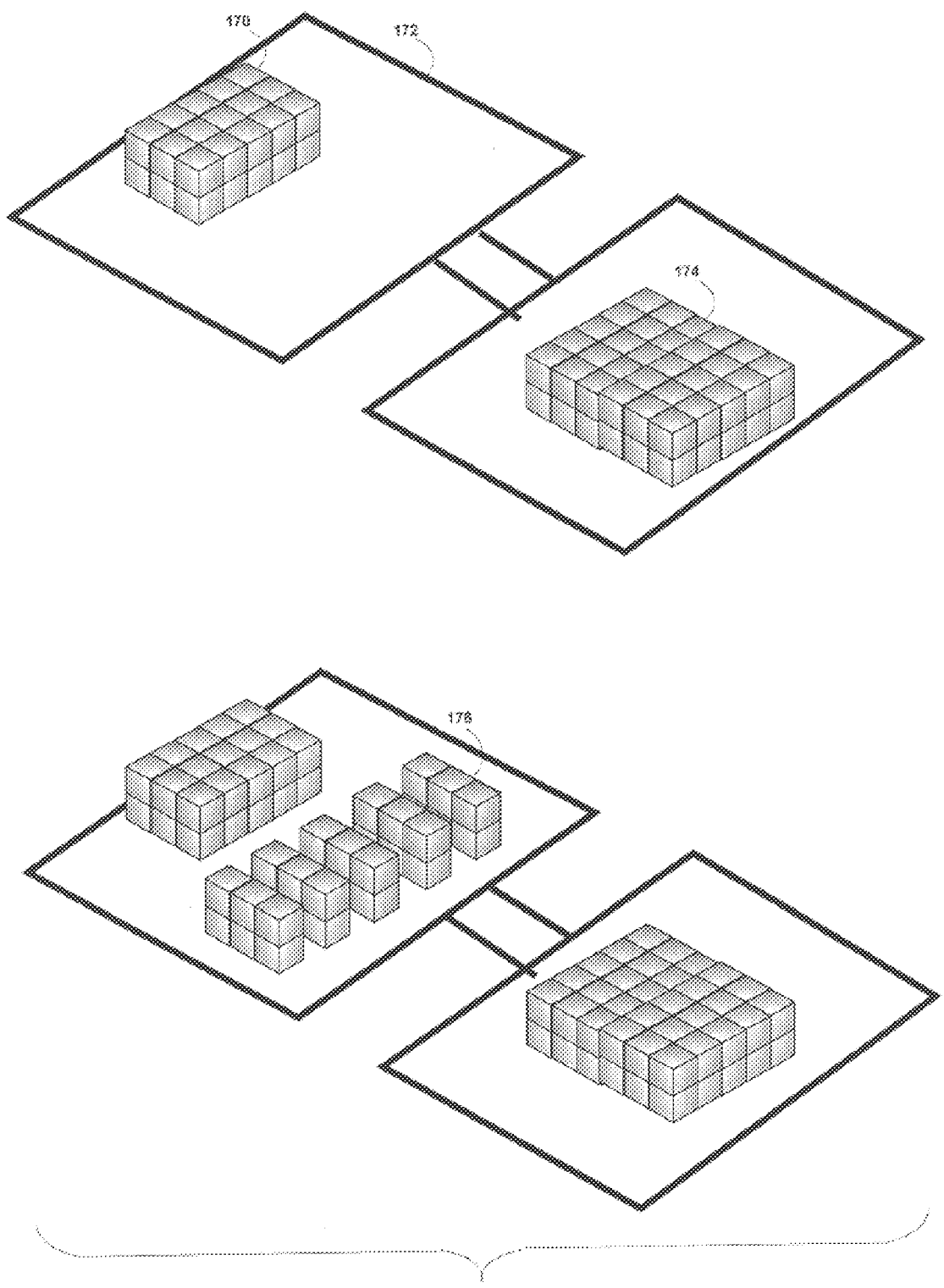
FIG. 18 shows a method of solving algebraic equations.
Figure 19:
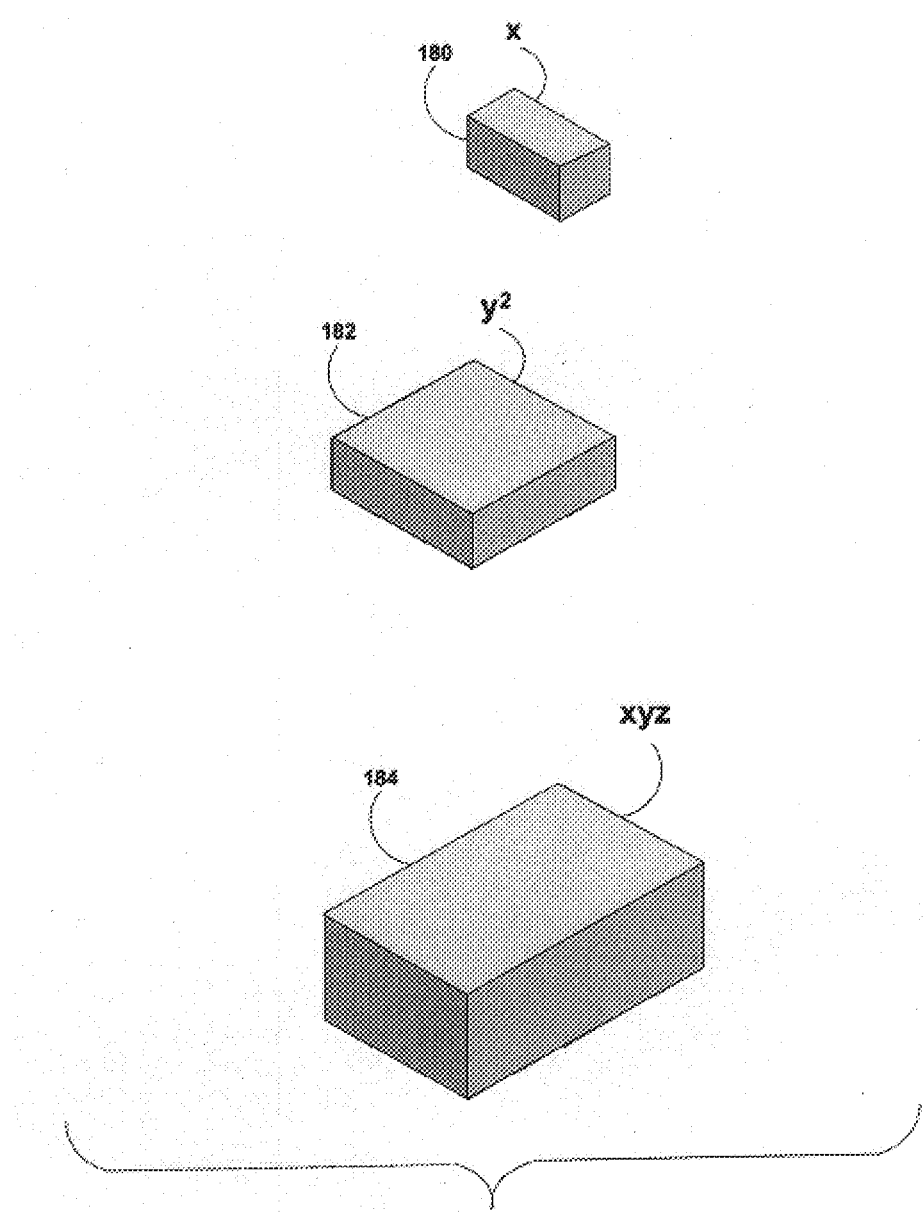
FIG. 19 shows a set of variables.

FIG. 18 shows a method of solving algebraic equations. The participant can solve any algebraic equation by placing the known "constants" as blocks on either side of the equation and then by searching for the unknown block that will make the equality true.

For example, FIG. 18 solves the equation:

$$5x+30=60.$$

In this case, the participant places a 30 prism block 170 and a five prism block 176 of an unknown quantity on one side of a comparison sheet (or scale) 172 and 60 prism block 174 on the other side of comparison sheet (or scale) 172. In order to make the equality true, the participant subtracts 30 from 60 and divides the equation by five. The participant can also find a quantity for the five prism block 176 that when added to the 30 prism block 170 equals the 60 prism block 174. As shown in FIG. 18 the answer is x=6. Using the concept of negatives as "a hole" the participant also introduces negative numbers as the value of x, a coefficient of x, or a constant.

Using the Factor Blocks to Represent Variables

In order to determine variables, the sides of the prism block are denoted as two, three, five, seven, etc. units long representing x, y, z, and w coordinates, respectively. Illustrative of this coordinate system is FIG. Z used to represent variables by the use of equations.

FIG. 19 shows:

A 1×1×2 rectangular prism 180 which represents the variable x

A 1×3×3 rectangular prism 182 which represents the variable y2

A 2×3×5 rectangular prism 184 which represents the variable xyz.

Alternate embodiments of the present invention contemplate the use of other prism block surface dimensions and accompanying equations of lines, wherein an infinite combination of variables are created.

Deriving Formulas for Sums of Number Sequences

Figure 20:
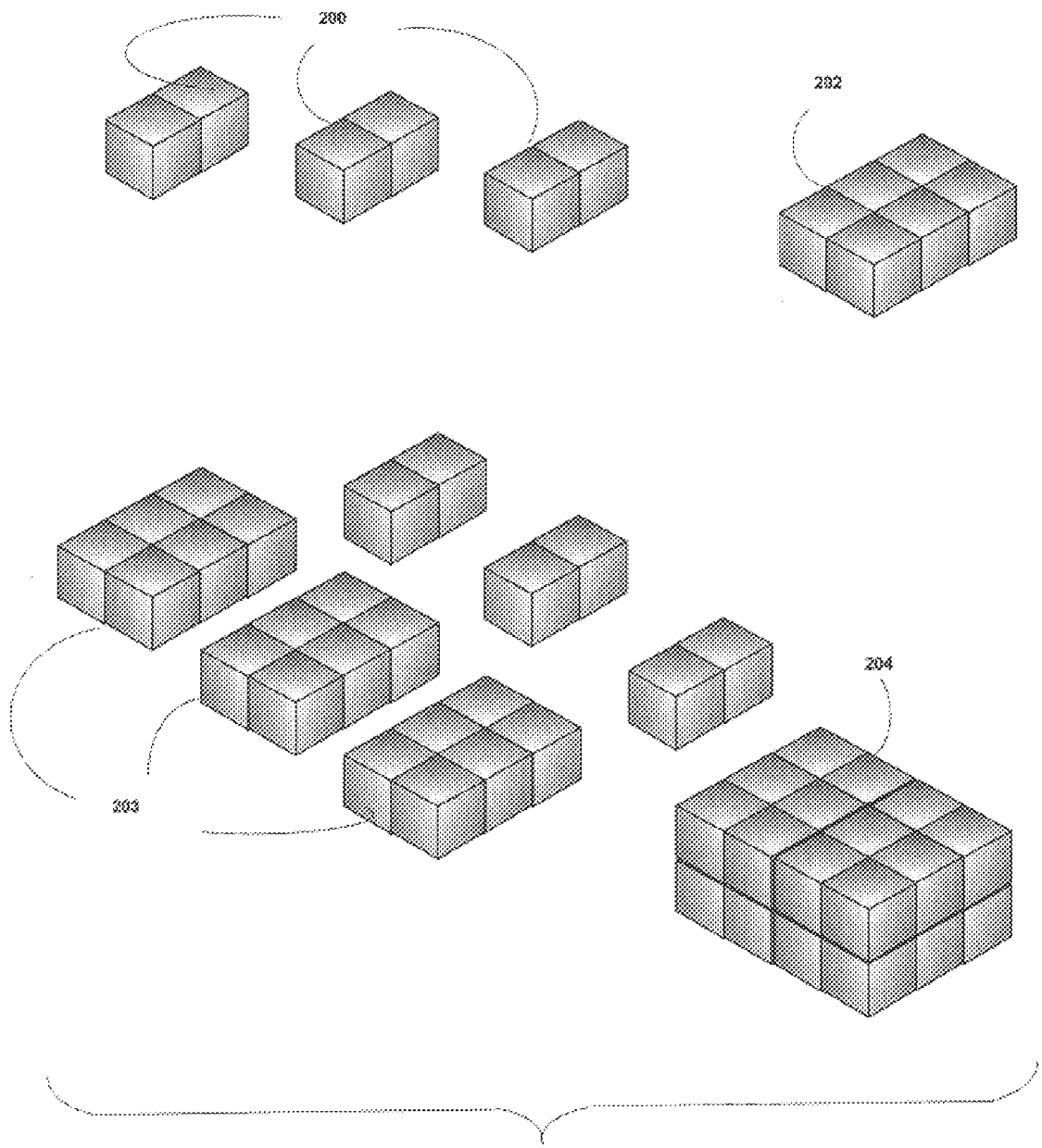
FIG. 20 shows a plan view for a method of constructing a proof

FIG. 20 shows a plan view for a method of constructing a proof using the Factor Blocks. In this particular illustration a proof for $(1\times2)+(2\times3)+(3\times4)+\ldots+(n-1)n=(n-1)n(n+1)/3$ is derived. Any proof can be constructed for any equation using the method as detailed below, including, but not limited to the following equations:

$$1+2+9+\ldots+n=n(n+1)/2$$

$$1+2^2+3^2+\ldots+n^2=n(n+1(2n+1)/6$$

$$1+2^3+3^3+\ldots+n^3=(1+2+3+\ldots+n)2.$$

With regard to FIG. 20 the construction of the proof $(1\times2)+(2\times3)+(3\times4)+\ldots+(n-1)n=(n-1)n(n+1)/3$ is detailed. The participant combines three two rods (1×2×3) 200 to make a level six prism block (1×2×3) 202. Next, the participant adds three level six prism blocks (1×2×3) 203 to the level six prism block (1×2×3) 202 to make a prism block (2×3×4) 204. Then, the participant adds three 12 prism blocks (1×3×4) 205 to the prism block (2×3×4) 204 to make a prism block (3×4×5) 206. Utilizing the above method, it is easy to conclude that:

$$1\times2+2\times3+\ldots(n-1)n=(n-1)n(n+1)/3.$$

Preferred and alternate embodiments of the present invention have now been described in detail. It is to be noted, however, that the description of the above embodiments are merely illustrative of the principles underlying the inventive concept. It is therefore contemplated that various modifications of the disclosed embodiments will, without departing from the spirit and scope of the invention, be apparent to persons of ordinary skill in the art.

I claim:

1. A mathematical factor kit for teaching mathematical skills, comprising:
   a) at least one one unit cube usable in six sides;
   b) at least one first rectangular prism usable in six sides having a length and a width of at least one unit and a height of at least a one digit prime number of units; and
   c) at least one second rectangular prism usable in six sides having a width of one unit and a length of one digit prime and a height of one digit prime number unit.

2. A mathematical factor kit for teaching mathematical skills of claim 1 further comprises at least one third rectangular prism having a width, a length, and a height of a one digit prime number of units, wherein said width, length, or height of said third rectangular prism is greater than two units.

3. A mathematical factor kit for teaching mathematical skills of claim 1 further comprises at least one triangular prism.

4. A mathematical factor kit for teaching mathematical skills of claim 1, further comprising a holding mat, wherein the sides of the holding mat measure at least a one digit prime number unit.

5. A mathematical factor kit for teaching mathematical skills of claim 3 wherein the triangular prism has a length of at least one unit and a base having a first, second and third side equal to any multiple of 3, 4, and 5 units, respectively.

6. A mathematical factor kit for teaching mathematical skills of claim 2 wherein the cube, first, second, and third rectangular prism each have at least one side which is scored.

7. A method of teaching mathematical skills, comprising:
   a) placing a set of rectangular prism manipulative elements on a holding mat, wherein the rectangular prisms manipulative elements comprise:
      (i) a rectangular prism, usable in six sides, having a length and a width of at least one unit and a height of a one digit prime number of units,
      (ii) a rectangular prism, usable in six sides, having a width of one unit and a length and height of a one digit prime number of units, wherein the prime numbers are the same or different, or
      (iii) a rectangular prism, usable in six sides, having a width, length, and a height of a one digit prime number of units, wherein the prime numbers are the same or different
   b) stacking said rectangular prisms to form rows and columns, and
   c) counting the rows and columns of said rectangular prisms to determine a number of rows and columns, wherein the rows and columns which are multiples of two units define even numbers and all other combinations define odd numbers and prime numbers.

8. A method of teaching mathematical skills of claim 7 further comprising calculating roots of numbers, wherein the method includes:
   a) arranging the manipulative elements in a number of equal rows and columns to form a grid format;
   b) setting a one prism manipulative element on a first row and first column space of the grid format;
   c) continuing to set manipulative elements in successive rows, the manipulative elements in successive rows having prisms that are equal to the one prism manipulative element multiplied by the row number in which the manipulative elements in successive rows are set;
   d) forming a diagonal with the manipulative elements so that the prisms of the manipulative elements are numbers that have whole number square roots; and
   e) calculating the roots of the whole square numbers by dividing the prisms of any manipulative element in the diagonal into a largest amount of equal set of prisms.

9. A method of teaching mathematical skills of claim 7 further comprising calculating multiples of numbers, wherein the method includes:
   a) arranging the manipulative elements in a number of equal rows and columns to form a grid format;
   a) setting a one prism manipulative element on a first row and first column space of the grid format
   b) continuing to set manipulative elements in successive rows, the manipulative elements in successive rows having prisms that are equal to the one prism manipulative element multiplied by the row number in which the manipulative elements in successive rows are set;
   c) continuing to set manipulative elements in successive columns, the manipulative elements in successive columns having prisms that are equal to the one prism manipulative element multiplied by the column row number in which the manipulative elements in successive column are set;

d) finding the manipulative element that is at an intersection point between the manipulative element in any row and the manipulative element in a same numbered column as the any row, and e) counting the number of prisms in the manipulative element that is at an intersection point.

10. A method of teaching mathematical skills of claim 7 further comprising calculating the Least Common Multiple, wherein the method includes:

a) choosing two numbers;

b) choosing two manipulative elements having prisms that are equal in number to the two numbers, the manipulative elements are defined as a first and a second manipulative element;

c) separating the manipulative elements by level shapes;

d) finding the largest side of the two manipulative elements that are common to the two manipulative elements;

e) placing the largest common side of first manipulative element perpendicular to the largest common side of the second manipulative element;

f) placing the largest common side of the first perpendicular manipulative element directly on the largest side of the second manipulative element;

g) constructing a box with sides equal to the largest common side of the first perpendicular manipulative element and the largest side of the second manipulative element; and h) calculating the volume of the rectangular block by counting the prisms within the box.

11. A method of teaching mathematical skills of claim 7 for calculating fractions, which comprises:

a) providing at least one manipulative unit that is equivalent to a whole unit;

b) dividing the manipulative unit into a fraction of the whole unit the fraction of the whole unit defined as a first fraction of the whole unit and a second fraction of the whole unit;

c) calculating the fractional equivalent of the first fraction of the whole of the divided manipulative unit by defining the first fraction of the whole unit as a numerator of the fraction and the whole unit as a denominator of the fraction, and d) calculating the fractional equivalent of the second fraction of the whole of the divided manipulative unit by defining the second fraction of the whole unit as a numerator of the fraction and the whole unit as a denominator of the fraction.

12. A method of teaching mathematical skills of claim 7 for adding fractions, which comprises:

a) replacing a set of fractions that are to be added by a set of precalculated manipulative elements equal to a whole number of the set of fractions;

b) adding the set of precalculated manipulative elements; and c) replacing the added set of precalculated manipulative elements with a precalculated fractional equivalent.

13. A method of teaching mathematical skills of claim 7 for subtracting fractions, which comprises:

a) replacing a set of fractions to be subtracted by a set of precalculated manipulative elements equal to a whole number of the set of fractions;

b) subtracting the set of precalculated manipulative elements; and c) replacing the subtracted set of precalculated manipulative elements with a precalculated fractional equivalent.

14. A method of teaching mathematical skills of claim 7 for dividing fractions, which comprises:

a) replacing a set of fractions to be divided by a set of precalculated manipulative elements equal to a whole number of the set of fractions;

b) dividing the set of precalculated manipulative elements; and c) replacing the divided set of precalculated manipulative elements with a precalculated fractional equivalent.

15. A method of teaching mathematical skills of claim 7 for multiplying fractions, which comprises:

a) replacing a set of fractions to be multiplied by a set of precalculated manipulative elements equal to a whole number of the set of fractions;

b) multiplying the set of precalculated manipulative elements; and c) replacing the multiplied precalculated manipulative elements with a precalculated fractional equivalent.

16. A method of teaching mathematical skills of claim 7 for graphing linear equations, which comprises:

a) arranging the manipulative elements in a step fashion along an x and y axis wherein each step comprises at least one prism;

b) counting the number of steps along the x axis for every step along the y axis;

c) counting the number of steps along the y axis for every step along the x axis; and d) equating the number of steps of the manipulative elements along the x axis to the number of steps along the y axis.

17. A method of teaching mathematical skills of claim 7 for constructing a proof, wherein the method includes:

a) placing at least one of the manipulative elements that is equivalent to a known constant on either side of the holding mat;

b) placing at least one manipulative element that is equivalent to an unknown constant on at least one side of the holding mat; and c) searching for at least one set of manipulative elements that would make the equation true.

18. A method of teaching mathematical skills of claim 7 for solving algebraic equations, wherein the method includes:

a) combining at least three rods composed of at least one manipulative element each with dimensions of at least 1×1×2 unit prisms forming a level prism block having dimensions of at least 1×2×3 units;

b) adding at least one three level prism blocks having dimensions of at least 1×2×3 units to the level prism block having dimensions of at least 1×2×3 units to form a larger prism block having dimensions of at least 2×3×4 units; and c) adding the at least three prism blocks having dimensions of at least 1×3×4 to the level prism block having dimensions of at least 2×3×4 units.

19. A mathematical factor kit for teaching mathematical skills, comprising:

at least one cube having 1×1×1 unit sides;

at least one rectangular prism, usable in six sides, having 1×1×2 unit sides;

at least one rectangular prism, usable in six sides, having 1×1×3 unit sides;

at least one rectangular prism, usable in six sides, having 1×2×2 unit sides;

at least one rectangular prism, usable in six sides, having 1×1×5 units sides;

at least one rectangular prism, usable in six sides, having 1×2×3 unit sides;

at least one rectangular prism, usable in six sides, having 1×1×7 unit sides;

at least one rectangular prism, usable in six sides, having 2×2×2 unit sides;

at least one rectangular prism, usable in six sides, having 1×3×3 unit sides;

at least one rectangular prism, usable in six sides, having 1×2×5 unit sides;

at least one rectangular prism, usable in six sides, having 2×2×3 unit sides;

at least one rectangular prism, usable in six sides, having 1×3×5 unit sides;

at least one rectangular prism, usable in six sides, having 2×2×5 unit sides;

at least one rectangular prism, usable in six sides, having 1×5×5 unit sides; and at least one rectangular prism, usable in six sides, having 2×3×5 unit sides.

20. A mathematical factor kit for teaching mathematical skills of claim 19, comprising:

6 cubes, each having 1×1×1 unit sides;

6 rectangular prisms, each usable in six sides and each having 1×1×2 unit sides;

4 rectangular prisms, each usable in six sides and each having 1×1×3 unit sides;

3 rectangular prisms, each usable in six sides and each having 1×2×2 unit sides;

2 rectangular prisms, each usable in six sides and each having 1×1×5 units sides;

2 rectangular prisms, each usable in six sides and each having 1×2×3 unit sides;

1 rectangular prism, usable in six sides, having 1×1×7 unit sides;

1 rectangular prism, usable in six sides, having 2×2×2 unit sides;

1 rectangular prism, usable in six sides, having 1×3×3 unit sides;

2 rectangular prisms, each usable in six sides and each having 1×2×5 unit sides;

1 rectangular prism, usable in six sides, each having 2×2×3 unit sides;

1 rectangular prism, usable in six sides, each having 1×3×5 unit sides;

1 rectangular prism, usable in six sides, each having 2×2×5 unit sides;

1 rectangular prism, usable in six sides, each having 1×5×5 unit sides; and 1 rectangular prism, usable in six sides, each having 2×3×5 unit sides.

21. A mathematical factor kit for teaching mathematical skills of claim 19, consisting essentially of:

6 cubes, each having 1×1×1 unit sides;

6 rectangular prisms, each usable in six sides and each having 1×1×2 unit sides;

4 rectangular prisms, each usable in six sides and each having 1×1×3 unit sides;

3 rectangular prisms, each usable in six sides and each having 1×2×2 unit sides;

2 rectangular prisms, each usable in six sides and each having 1×1×5 units sides;

2 rectangular prisms, each usable in six sides and each having 1×2×3 unit sides;

1 rectangular prism, usable in six sides, having 1×1×7 unit sides;

1 rectangular prism, usable in six sides, having 2×2×2 unit sides;

1 rectangular prism, usable in six sides, having 1×3×3 unit sides;

2 rectangular prisms, each usable in six sides and each having 1×2×5 unit sides;

1 rectangular prism, usable in six sides, each having 2×2×3 unit sides;

1 rectangular prism, usable in six sides, each having 1×3×5 unit sides;

1 rectangular prism, usable in six sides, each having 2×2×5 unit sides;

1 rectangular prism, usable in six sides, each having 1×5×5 unit sides; and 1 rectangular prism, usable in six sides, each having 2×3×5 unit sides.

* * * * *